United States Patent
Fan et al.

(10) Patent No.: US 9,330,163 B2
(45) Date of Patent: *May 3, 2016

(54) IDENTIFYING INCONSISTENCIES IN OBJECT SIMILARITIES FROM MULTIPLE INFORMATION SOURCES

(71) Applicant: INTERNATIONAL BUSINESS MACHINES CORPORATION, Armonk, NY (US)

(72) Inventors: Wei Fan, Hawthorne, NY (US); Jing Gao, Urbana, IL (US); Srinivasan Parthasarathy, Hawthorne, NY (US); Deepak Turaga, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/011,175

(22) Filed: Aug. 27, 2013

(65) Prior Publication Data

US 2013/0346411 A1 Dec. 26, 2013

Related U.S. Application Data

(63) Continuation of application No. 13/316,178, filed on Dec. 9, 2011, now Pat. No. 8,572,107.

(51) Int. Cl.
*G06F 17/30* (2006.01)
*G11B 27/32* (2006.01)

(52) U.S. Cl.
CPC .......... *G06F 17/30598* (2013.01); *G11B 27/32* (2013.01)

(58) Field of Classification Search
CPC ............... G06F 17/30864; G06Q 30/0201; G06Q 10/10
See application file for complete search history.

(56) References Cited

U.S. PATENT DOCUMENTS

| | | | |
|---|---|---|---|
| 7,743,058 B2 | 6/2010 | Liu et al. | |
| 7,797,302 B2 | 9/2010 | Kenedy et al. | |
| 7,844,595 B2 | 11/2010 | Canright et al. | |
| 8,180,760 B1 * | 5/2012 | Carver | G06Q 30/0241 707/708 |
| 2003/0145002 A1 * | 7/2003 | Kleinberger | G06F 17/30873 |
| 2005/0198056 A1 * | 9/2005 | Dumais et al. | 707/101 |
| 2007/0260639 A1 * | 11/2007 | Tobin et al. | 707/104.1 |
| 2009/0150376 A1 * | 6/2009 | O'Callaghan | G06K 9/6232 |
| 2009/0234899 A1 | 9/2009 | Kramer | |
| 2009/0319295 A1 | 12/2009 | Kass-Hout et al. | |

(Continued)

OTHER PUBLICATIONS

Ulrike von Luxburg. "A Tutorial on Spectral Clustering. Statistics and Computing," Statistics and Computing, 17 (4), Dec. 2007.

(Continued)

*Primary Examiner* — Mariela Reyes
*Assistant Examiner* — Courtney Harmon
(74) *Attorney, Agent, or Firm* — F. Chau & Associates, LLC

(57) ABSTRACT

A horizontal anomaly detection method includes receiving at plurality of objects described in a plurality of information sources, wherein each individual information source captures a plurality of similarity relationships between the objects, combining the information sources to determine a similarity matrix whose entries represent quantitative scores of similarity between pairs of the objects, and identifying at least one horizontal anomaly of the objects within the similarity matrix, wherein the horizontal anomalies are anomalous relationships across the plurality of information sources.

15 Claims, 3 Drawing Sheets

(56) References Cited

U.S. PATENT DOCUMENTS

| | | |
|---|---|---|
| 2010/0235489 A1 | 9/2010 | Cogan |
| 2011/0004935 A1 | 1/2011 | Moffie et al. |
| 2011/0179044 A1 | 7/2011 | Crum et al. |
| 2011/0282860 A1* | 11/2011 | Baarman ........... G06F 17/30864 707/709 |

OTHER PUBLICATIONS

V. Chandola, A. Banerjee, and V. Kumar. Anomaly detection: A survey. ACM Computing Surveys, vol. 41, No. 3, Article 15, Publication date: Jul. 2009.

Inderjit S. Dhillon. Co-clustering documents and words using Bipartite Spectral Graph Partitioning. Proceeding KDD-2001, Proceedings of the seventh ACM SIGKDD international conference on Knowledge discovery and data mining. Aug. 26-29, 2001.

Ide et al., "Eigenspace-based Anomaly Detection in Computer Systems," Proceedings of the 10th ACM SIGKDD International Conference on Knowledge Discovery and Data Mining, ACM Press, 440-449, (Aug. 22-25, 2004).

Pothen et al., "Partitioning Sparse Matrices with Eigenvectors of Graphs," SIAM Journal on matrix Analysis and Applications, vol. 11 Issue 3, Jul. 1990.

\* cited by examiner

101 GENRE
102 USERS

X1-The Lion King; X2-Toy Story; X3-Kungfu Panda; X4-Wall-E;
X5-Casablanca; X6-Titanic; X7-The Notebook

FIG. 3

$$A = \begin{bmatrix} 0 & 1 & 1 & 1 & 0 & 0 & 0 \\ 1 & 0 & 0 & 1 & 0 & 0 & 0 \\ 1 & 0 & 0 & 1 & 0 & 0 & 0 \\ 1 & 1 & 1 & 0 & 0 & 0 & 0 \\ 0 & 0 & 0 & 0 & 0 & 1 & 1 \\ 0 & 0 & 0 & 0 & 1 & 0 & 1 \\ 0 & 0 & 0 & 0 & 1 & 1 & 0 \end{bmatrix}$$

$$W = \begin{bmatrix} 0 & 0.4 & 0.2 & 0 & 0 & 0 & 0 \\ 0.4 & 0 & 0.6 & 0 & 0 & 0 & 0 \\ 0.2 & 0.6 & 0 & 0 & 0 & 0 & 0 \\ 0 & 0 & 0 & 0 & 0.4 & 0.2 & 0.8 \\ 0 & 0 & 0 & 0.4 & 0 & 0.2 & 0.2 \\ 0 & 0 & 0 & 0.2 & 0.2 & 0 & 0.2 \\ 0 & 0 & 0 & 0.8 & 0.2 & 0.2 & 0 \end{bmatrix}$$

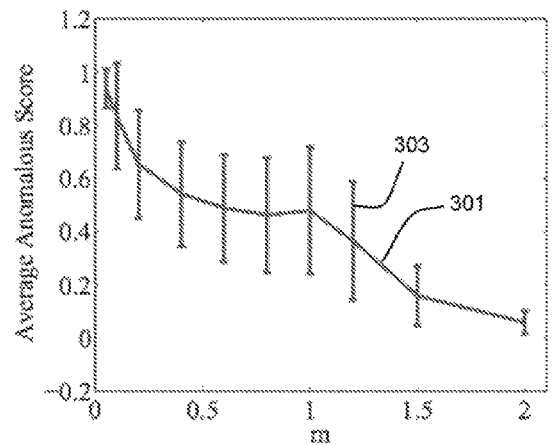
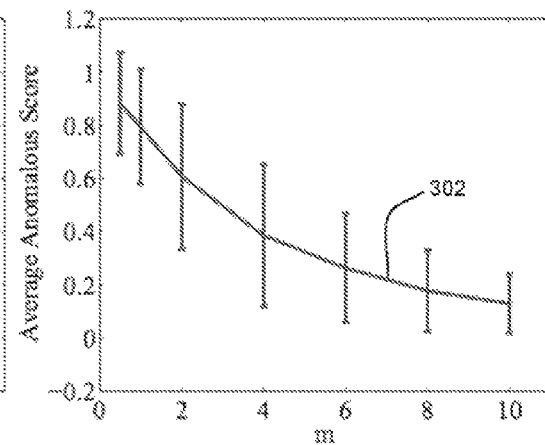
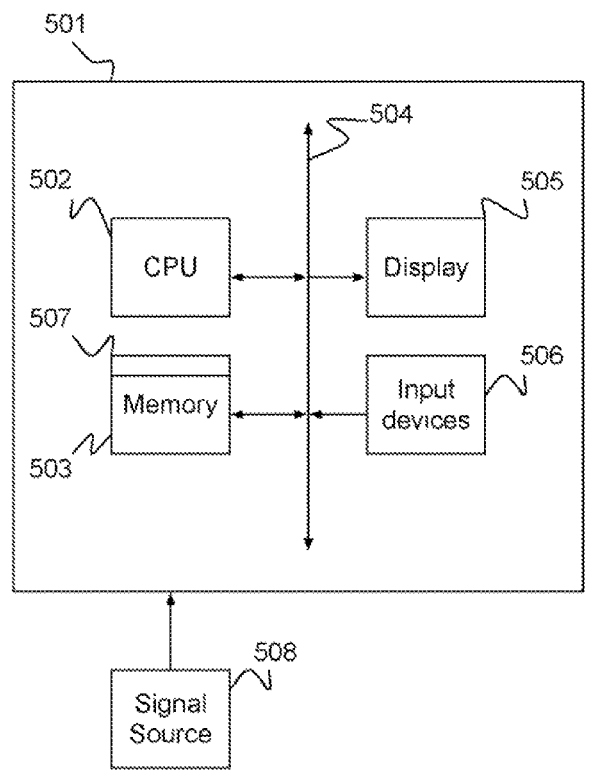

IDENTIFYING INCONSISTENCIES IN OBJECT SIMILARITIES FROM MULTIPLE INFORMATION SOURCES

CROSS REFERENCE TO RELATED APPLICATIONS

This Application is a Continuation of co-pending U.S. patent application Ser. No. 13/316,178, filed Dec. 9, 2011, the entire contents of which are herein incorporated by reference.

GOVERNMENT LICENSE RIGHTS

This invention was made with government support under Contract No.: H98230-07-C-0383 awarded by Intelligence Agencys. The Government has certain rights in this invention.

BACKGROUND OF THE INVENTION

1. Technical Field

The present disclosure generally relates to anomaly detection and more particularly to anomaly detection with multiple sources of information.

2. Discussion of Related Art

Anomaly detection refers to the task of detecting objects whose characteristics deviate significantly from the majority of the data. Anomaly detection is widely used in a variety of domains, such as intrusion detection, fraud detection, fault detection, system health monitoring, event detection in sensor networks, and so on.

BRIEF SUMMARY

According to an embodiment of the present disclosure, a horizontal anomaly detection method includes receiving at plurality of objects described in a plurality of information sources, wherein each individual information source captures a plurality of similarity relationships between the objects, combining the information sources to determine a similarity matrix whose entries represent quantitative scores of similarity between pairs of the objects, and identifying at least one horizontal anomaly of the objects within the similarity matrix, wherein the horizontal anomalies are anomalous relationships across the plurality of information sources.

According to an embodiment of the present disclosure, a horizontal anomaly detection method includes receiving at plurality of objects described in a plurality of information sources, wherein a matrix of each individual information source captures a plurality of similarity relationships between the objects, combining the information sources to determine a similarity matrix comprising a feature vector of entries for each of the objects and each entry corresponds to a similarity between a different pair of the objects, wherein the entries represent quantitative scores indicate a degree of similarity between spectral embeddings derived from the matrices of the information sources, and identifying at least one horizontal anomaly of the objects within the similarity matrix, wherein the horizontal anomalies are anomalous relationships across the plurality of information sources.

According to an embodiment of the present disclosure, a horizontal anomaly detection method includes determining a plurality of N×N similarity matrices for N objects, wherein entries of each similarity matrix define similarities between different pairs of the N objects, performing a soft clustering on the similarity matrices together with a constraint that an object should be similarly assigned to a same cluster in each of the similarity matrices, and quantifying a difference between clustering solutions of each similarity matrices to derive anomalous scores.

BRIEF DESCRIPTION OF THE SEVERAL VIEWS OF THE DRAWINGS

Preferred embodiments of the present disclosure will be described below in more detail, with reference to the accompanying drawings:

FIG. 3 illustrates exemplary matrices A and W used for detecting a horizontal anomaly according to an embodiment of the present disclosure;

FIGS. 4A-B are graphs of a parameter m of an exemplary implementation of a horizontal anomaly detection method on a data set according to an embodiment of the present disclosure; and FIG. 5 shows an exemplary computer system for performing a method for horizontal anomaly detection according to an embodiment of the present disclosure.

DETAILED DESCRIPTION

According to an exemplary embodiment of the present disclosure, horizontal anomalies are objects that exhibit inconsistent similarity relationships across different sources of information. Intuitively, horizontal anomalies belong to different clusters when considering aspects from multiple information sources. For example, a movie that is tagged as a comedy by genre, but is viewed by users that watch thriller movies, is likely to be a horizontal anomaly. An example of horizontal anomaly detection is shown in FIG. 1.

Figure 1:
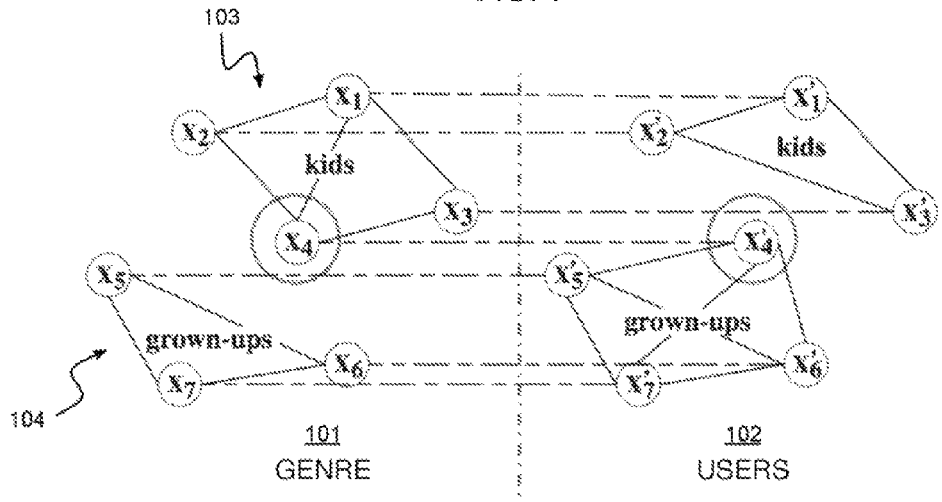
FIG. 1 is an example of horizontal anomaly detection according to an embodiment of the present disclosure.

FIG. 1 shows the similarity relationships among a set of movies $(x_1, x_2, \ldots, x_7)$ derived from two information sources: movie genres (101) and users (102), shown as two similarity graphs. The genre information may indicate that two "kids" movies, e.g., $x_2$ and $x_4$, are more similar than two movies, one of which is a "kids" movie and one of which is a "grown-ups" moive, e.g., $x_2$ and $x_5$, respectively. Similarly, movies watched by the same set of users are likely to be more similar than movies that are watched by completely different sets of users.

Objects form a variety of clusters or communities based on individual similarity relationship. For example, two clusters can be found from both of the similarity graphs 101 and 102 in FIG. 1. One cluster 103 represents the movies that are animations, for which children or kids are the most likely users, while the other cluster 104 represents romance movies, for which adults or grown-ups are the most likely users. In the example, most of the movies belong to the same cluster even though different information sources are used. There are some objects that fall into different clusters with respect to different sources. In this example, the animated movie "Wall-E" ($x_4$) by genre is expected to be liked by kids, but is liked by grown-ups based on user viewing history. Finding such inconsistent movies can help film distributors better understand the expected audiences of different movies and make smarter marketing plans.

According to an embodiment of the present disclosure, horizontal anomaly detection may be used to detect objects that have inconsistent behavior among multiple information sources. Some other example scenarios of horizontal anomaly detection include detecting people who fall into different social communities with respect to different online social networks and detecting inconsistency across multiple module interaction graphs derived from different versions of a software project. Furthermore, identifying horizontal anomalies can find applications in many fields including smarter planet, internet of things, intelligent transportation systems, marketing, banking, etc.

According to an exemplary embodiment of the present disclosure, a systematic approach to identifying horizontal anomalies from multiple information sources assumes that each individual information source captures some similarity relationships between objects that may be represented in the form of a similarity matrix (whose entries represent the pairwise quantitative similarity between objects). The input matrices may be combined into one similarity matrix, wherein spectral techniques may be used to identify the key eigenvectors of the graph Laplacian of the combined matrix. Horizontal anomalies may be identified by determining cosine distance between the components of these eigenvectors. The exemplary method can be regarded as conducting spectral clustering on multiple information sources simultaneously with a joint constraint that the underlying clustering structures are similar, and objects that are clustered differently are categorized as horizontal anomalies. The horizontal anomalies may also be regarded as those having long commute time in the random walk defined over the graph.

More particularly, given a set of N objects $X=\{x_1, x_2, \ldots, x_N\}$ and P information sources that describe different aspects of these objects, an anomalous score $s_i$ is assigned to each object $x_i$, which represents how likely the object is anomalous when its behavior differs among the P different information sources. An exemplary horizontal anomaly detection method is described herein. An object can be regarded as a horizontal anomaly if it is assigned to different clusters when using various information sources, and thus an anomalous degree of an object may be determined based on how much its clustering solutions differ from each other.

Figure 2A:
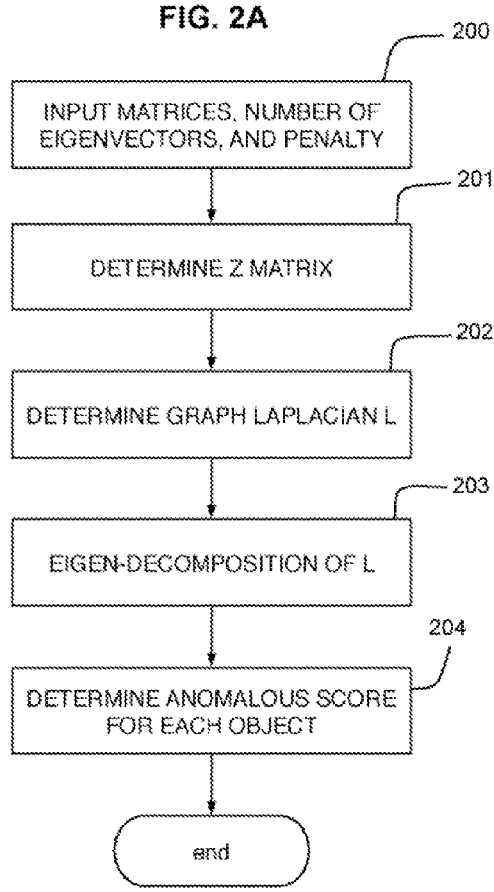
FIG. 2A is a flow diagram for a horizontal anomaly detection method according to an embodiment of the present disclosure.
Figure 2B:
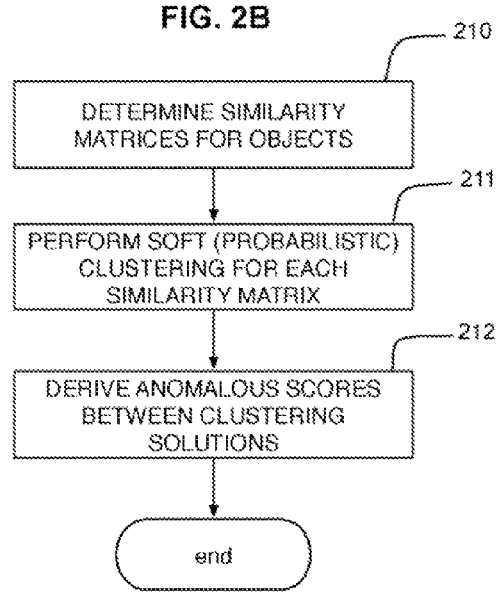
FIG. 2B is a flow diagram for a horizontal anomaly detection method according to an embodiment of the present disclosure.

Referring now to FIG. 2A, an exemplary horizontal anomaly detection method takes a plurality of similarity matrices, number of eigenvectors, and penalty parameter as input (200). For example, referring to FIG. 2B, given two N×N similarity matrices on N objects: A and W (210), where $a_{ij}$ and $w_{ij}$ define the similarity between $x_i$ and $x_j$ from different aspects, an exemplary method performs soft (probabilistic) clustering on A and W together with the constraint that an object is expected be assigned to a same cluster in each clustering solution 211, and differences between the clustering solutions are qualified to derive anomalous scores 212. More particularly, a combined graph may be constructed by connecting the nodes, which correspond to the same object in the two similarity graphs with an edge weighted m·m, a large positive number, is a penalty parameter. An example of such a graph is shown in FIG. 1. The set of nodes in the combined graph includes two copies of the objects: $\{x_1, \ldots, x_N, x'_1, \ldots, x'_N\}$ (2N nodes in total). Let M be an N×N diagonal matrix with m on the diagonal: M=m·I, where I is an N×N identity matrix. At block 201, matrix Z, the adjacency matrix of the combined graph, which is a 2N×2N matrix, may be determined as:

$$Z = \begin{bmatrix} A & M \\ M & W \end{bmatrix}. \quad (1)$$

At block 202, the graph Laplacian L may be determined as:

$$L = D - Z \quad (2)$$

using degree matrix D (a 2N×2N diagonal matrix):

$$D = \mathrm{diag}\left(\left\{\sum_{j=1}^{2N} z_{ij}\right\}_{i=1}^{2N}\right). \quad (3)$$

At block 203, the method determines the k smallest eigenvectors of L (with smallest eigenvalues) and let $H \in R^{2N \times k}$ be the matrix containing these eigenvectors as columns. H may be divided into two submatrices U and V each with size N×k so that $H=[U\ V]^T$. Therefore, the i-th and (i+N)-th rows of H are represented as:

$$\vec{u}_i = \vec{h}_i,\ \vec{v}_i = \vec{h}_{i+N}, \quad (4)$$

which correspond to two soft clustering representations of $x_i$ with respect to A and W, respectively. As can be seen, with the help of the edge between the copies of the same object, objects may be clustered in the same way across different sources. At block 204, the anomalous score for object $x_i$ using cosine distance between the two vectors:

$$s_i = 1 - \frac{\vec{u}_i \cdot \vec{v}_i}{\|\vec{u}_i\| \cdot \|\vec{v}_i\|}. \quad (5)$$

In view of the foregoing, an exemplary horizontal anomaly detection method may be summarized as follows:
Input: similarity matrices A and W, number of eigenvectors k, penalty parameter m;
1. Determine matrix Z according to Eq. (1);
2. Determine graph Laplacian L as in Eq. (2);
3. Conduct eigen-decomposition of L and let H be the k smallest eigenvectors with smallest eigenvalues; and
4. Determine anomalous score of each object $s_i$ based on Eq. (4) and Eq. (5) for i=1, ..., N Output: anomalous score vector $\vec{s}$.

In an example as shown in FIG. 3, the two matrices A and W describe pairwise similarities among 7 objects. An anomalous score vector $\vec{s}$ may be determined as: s=(0.4626, 0.7157, 0.7736, 0.8349, 0.7013, 0.6614, 0.5587)$^T$, where each score denotes a degree of being horizontally anomalous. In the example, $x_4$ has the highest anomalous score in this example, and thus it is more likely to be a horizontal anomaly.

Turning now to the clustering on combined graphs, spectral clustering may be performed on the combined graph. The spectral clustering projects the objects into a low-dimensional space, defined by the k smallest eigenvectors of the graph Laplacian matrix, so that the objects in the new space may be separated. The projections may be referred to as spectral embeddings of the objects. It has been shown that the matrix formed by the k eigenvectors (H) of L is the solution to the following optimization problem:

$$\min_{H \in R^{N \times k}} Tr(H'LH)\ s.t.\ H'H = I \quad (6)$$

H is a 2N×k matrix, which is equal to $[U\ V]^T$. The graph Laplacian L is defined as D−Z (Eq. 2), and Z is defined in Eq. (1). Moreover, suppose the degree matrices for A and W are $D^a$ and $D^w$ respectively:

$$D = \text{diag}\left(\left\{\sum_{j=1}^{N} a_{ij}\right\}_{i=1}^{N}\right), D = \text{diag}\left(\left\{\sum_{j=1}^{N} w_{ij}\right\}_{i=1}^{N}\right).$$

Then, derive an equivalent formulation for the problem in Eq. (6):

$$\min_{U,V} Tr(U'(D^a - A)U) + \quad (7)$$
$$Tr(U'(D^w - W)V) - 2m\sum_{i=1}^{n}\sum_{j=1}^{k} u_{ij}v_{ij} \text{ s.t. } U'U + V'V = I$$

Each of the first two terms in Eq. (7) corresponds to the spectral clustering problem using A or W alone. The third term acts as the constraint that the two clustering solutions should be similar (cosine similarity). Therefore, the blocks 201-203 may be interpreted as conducting spectral clustering on the two input similarity graphs simultaneously with a joint constraint.

Our goal is to detect horizontal anomalies that have inconsistent behavior across sources, and thus block 204 is to determine anomalous scores. Note that in the exemplary method above, the i-th row vector in U (the first N rows of H) and V (the last N rows of H) contain the projections of the object $x_i$. Due to the principle of spectral clustering, if the spectral embeddings $\vec{u}_i$ and $\vec{v}_i$ are close to each other, the corresponding object $x_i$ is more likely to be assigned to the same cluster with respect to two different sources. Therefore, the cosine similarity between the two vectors $\vec{u}_i$ and $\vec{v}_i$ quantifies how similar the clustering results of object xi on the two sources are, and thus represents its "normal" degree. In turn, the cosine distance as defined in Eq. (5) gives the anomalous degree of $x_i$ with respect to the two sources. The higher the score $s_i$ is, the more likely $x_i$ is a horizontal anomaly.

Reviewing to the random walk, given a random walk over the combined graph, where the transition probability from node $x_i$ to node $x_j$ is proportional to the edge weight in the graph, let $z_{ij}$ be the edge weight between two nodes $x_i$ and $x_j$ in the graph, and $\text{vol}(X) = \sum_{i=1}^{2N}\sum_{j=1}^{2N} z_{ij}$ be the sum of all the edge weights in the graph. Referring to the commute distance between $x_i$ and $x'_i$, two copies of the same object in the combined graph. Determine a distance is the expected time it takes for the random walk to travel from $x_i$ and $x'_i$ and back, and it can be determined using the eigenvectors of the graph Laplacian L as defined in Eq. (2). Suppose L has eigenvlaues $\lambda_1, \ldots, \lambda_{2n}$, and U and V are two N×N matrices containing all the eigenvectors for the copies of the objects respectively. Let $\vec{u}_i$ and $\vec{v}_i$ denote the i-th row of U and V. $\vec{\gamma}$ is a length-2N vector with each entry $\gamma_l$ equal to $(\lambda_l)^{-0.5}$ if $\lambda_l \neq 0$, and 0 otherwise. Dividing $\vec{\gamma}$ into two length-N vectors $\vec{\gamma} = [\vec{\gamma}_u\ \vec{\gamma}_v]$. It can be derived that the distance $c_i$ between $x_i$ and $x'_i$ is: $c_i = \text{vol}(X)\|\vec{u}_i \cdot \vec{\gamma}_u - \vec{v}_i \cdot \vec{\gamma}_u\|^2$.

Recall that the anomalous score of $x_i$ may be determined as $$1 - \frac{\vec{u}_i \cdot \vec{v}_i}{\|\vec{u}_i\| \cdot \|\vec{v}_i\|}.$$

Observe that both the anomalous score and the commute distance can be represented as a distance function applied on the spectral embeddings of the two copies of the object. The difference is that all the eigen-vectors are used and they are scaled by $(\lambda_j)^{-0.5}$ in the commute distance determination. Also, an Euclidean distance may be used for the commute distance determination instead of a cosine distance.

Commute distance can be a helpful intuition to understand the anomalous scores. If it takes longer time to commute between the two copies of object $x_i$ in the graph, $x_i$ is more likely to be a horizontal anomaly Referring to the input of multiple sources; the exemplary method may be adapted to handle more than two information sources as follows. Given similarity matrices $\{W^{(1)}, W^{(2)}, \ldots, W^{(P)}\}$ as the input, the combined graph may be constructed. More particularly, the combined graph may be constructed by duplicating the objects for P copies, in each copy retain the similarity information from each source, and connect each pair of the nodes corresponding to the same object with an edge weighted m. Then, a graph Laplacian of the combined graph and the k smallest eigenvectors may be determined. One concern is that, when the number of information sources increases, the size of the matrix L grows quadratically. Note that the graph Laplacian of Z is a sparse matrix, and also, only the k smallest eigenvectors are used (e.g., k=3), instead of the full eigenspace. Packages such as ARPACK are available to determine a small number of eigenvectors of large-scale sparse matrix. The anomalous degree of an object $x_i$ may be determined based on the following P vectors: $\{\vec{h}_i, \vec{h}_{i+N}, \vec{h}_{i+2N}, \ldots, \vec{h}_{i+(P-1)N}\}$. In the experiment, an average pairwise distance may be used as the measure:

$$s_i = \frac{1}{P(P-1)}\sum_{a=0}^{P-1}\sum_{b=0}^{P-1} 1_{a \neq b} \cdot \left[1 - \frac{\vec{h}_{i+aN} \cdot \vec{h}_{i+bN}}{\|\vec{h}_{i+aN}\| \cdot \|\vec{h}_{i+bN}\|}\right]$$

Consider now an exemplary implementation of an embodiment of the present disclosure. For two horizontal anomaly detection tasks based on the DBLP (DataBase systems and Logic Programming) data, which provides bibliographic information on major computer science journals and proceedings where the objects are a set of conferences and authors respectively. In the exemplary implementation, 4220 conferences are represented in two views: keywords in the conferences and authors who published in the conferences. Specifically, each conference $x_i$ has two vectors. In the first vector, each entry is the number of times each word appeared in the paper titles of $x_i$. In the second vector, each entry denotes the number of times an author published in $x_1$. The pairwise similarity between two conferences $x_i$ and $x_j$ is defined as the cosine similarity between the corresponding vectors. Therefore, the conferences that share many keywords, or share many authors are similar. For a selection of a set of 3116 authors from data mining related areas and extracting two types of information from DBLP: the publications and the co-authorships, each author $x_i$ has two vectors where in the first vector each entry denotes the occurrence of each word in the authors' publications, and each entry corresponds to the number of times two authors collaborate in the second one. Cosine similarity is used, and similar authors will share co-authors, or keywords in their publications.

Referring to the effect of m on the anomalous scores, for each m, an exemplary horizontal anomaly detection method is applied to the data sets, and the mean and standard deviation of the objects' anomalous scores are determined. The results on conferences and authors are shown in FIGS. 4A-B, respectively, where the points on the line 401 or 402 are the average anomalous scores and the error bars, e.g., 403 denote the standard deviation. As can be seen, the average anomalous score decreases as m increases. Recall that the anomalous scores indicate the degree of differences between the spectral embeddings derived from the two similarity matrices. When a penalty on different embeddings by the two sources is increased, the two projections are biased towards the ones that agree the most. Therefore, when m is larger, the spectral embeddings from the two sources are more likely to be the same, and thus the difference between them is smaller. Further, the variance among the anomalous scores goes up first and then goes down as m increases. When m is large or small, the two projections of all the objects would be similar or different, and thus the objects receive similar anomalous scores. There exists a large variability among the anomalous scores only when m is in the middle of the spectrum. Although m can be drawn from $(0, \infty)$, the average anomalous scores are within a fixed range: $[0,1]$. Therefore, we can choose m, which leads to an average anomalous score around 0.5 because the variance of the anomalous scores usually reaches the highest point here and this helps identify the horizontal anomalies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 5, according to an embodiment of the present disclosure, a computer system 501 for anomaly detection can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process the signal from the signal source 508. As such, the computer system 501 is a general-purpose computer system that becomes a specific purpose computer system when executing the routine 507 of the present invention.

The computer platform 501 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described embodiments for anomaly detection, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A horizontal anomaly detection method comprising:
   receiving a plurality of descriptions describing a plurality of objects, each object of the plurality of objects being described by a plurality of different information sources, wherein each individual information source of the plurality of information sources captures a different similarity relationship between the plurality of objects, thereby establishing a plurality of different similarity relationships, wherein each of the plurality of different similarity relationships represents a unique set of criteria by which the plurality of objects may be grouped as similar and wherein each of the plurality of different similarity relationships are represented by an individual similarity matrix;
   generating a similarity matrix from the plurality of different information sources, wherein entries of the similarity matrix represent quantitative scores of similarity between pairs of the plurality of objects in accordance with each of the plurality of different similarity relationships and wherein the generating of the similarity matrix comprises placing, in the similarity matrix, each individual similarity matrix along a block diagonal of the similarity matrix and filling off-diagonal entries of the similarity matrix using weighted identity matrices, wherein a weight of the weighted identity matrices is a constraint on relationships across the plurality of information sources; and
   identifying at least one horizontal anomaly within the plurality of objects from the similarity matrix, wherein the horizontal anomalies each comprise a first clustering of at least two objects of the plurality of objects into a common cluster based on a first information source of the plurality of different information sources and simultaneously performing a second clustering of the at least two objects of the plurality of objects into different clusters based on a second information source of the plurality of different information sources, wherein an expectation exists that, in the first clustering, objects of the common cluster based on the first information source would also be clustered together in the second clustering based on the second information source,
   wherein the steps of receiving the descriptions, generating the similarity matrix, and identifying the at least one horizontal anomalies are performed using a computer system.

2. The horizontal anomaly detection method of claim 1, wherein identifying the at least one horizontal anomaly comprises performing a spectral clustering method to cluster of the objects across the plurality of information sources.

3. The horizontal anomaly detection method of claim 2, wherein the spectral clustering method comprises:
   determining a graph Laplacian of the similarity matrix, where eigenvectors of the graph Laplacian are partitioned into components corresponding to individual ones of the plurality of information sources;
   determining a distance between the components for each of the objects; and
   classifying each of the objects into the horizontal anomalies according to the respective distances.

4. The horizontal anomaly detection method of claim 1, wherein higher quantitative scores correspond to anomalies.

5. The horizontal anomaly detection method of claim 1, wherein the similarity matrix comprises a feature vector of the entries for each of the objects and each entry corresponds to a similarity between a different pair of the objects.

6. The horizontal anomaly detection method of claim 1, further comprising a computer program product for detecting the horizontal anomaly, the computer program product comprising a computer readable storage medium having computer readable program code embodied therewith for performing the method of claim 1.

7. A computer program product for detecting the horizontal anomaly, the computer program product comprising a non-transitory computer readable storage medium having computer readable program code embodied therewith for performing a horizontal anomaly detection method comprising:
   receiving a plurality of descriptions describing a plurality of objects, each object of the plurality of objects being described by a plurality of different information sources, wherein a matrix of each individual information source of the plurality of information sources captures a different similarity relationship between the plurality of objects, thereby establishing a plurality of different similarity relationships, wherein each of the plurality of different similarity relationships represents a unique set of criteria by which the plurality of objects may be grouped as similar and wherein each of the plurality of different similarity relationships are represented by an individual similarity matrix;

generating a similarity matrix from the plurality of different information sources, the similarity matrix comprising a feature vector of entries for each of the plurality of objects, wherein each entry of the similarity matrix corresponds to a similarity between a different pair of the plurality of objects in accordance with each of the plurality of different similarity relationships, wherein the entries represent quantitative scores indicate a degree of similarity between spectral embeddings derived from the matrices of the information sources and wherein the generating of the similarity matrix comprises placing, in the similarity matrix, each individual similarity matrix along a block diagonal of the similarity matrix and filling off-diagonal entries of the similarity matrix using weighted identity matrices, wherein a weight of the weighted identity matrices is a constraint on relationships across the plurality of information sources; and identifying at least one horizontal anomaly within the plurality of objects from the similarity matrix, wherein the horizontal anomalies each comprise a first clustering of at least two objects of the plurality of objects into a common cluster based on a first information source of the plurality of different information sources and simultaneously performing a second clustering of the at least two objects of the plurality of objects into different clusters based on a second information source of the plurality of different information sources, wherein an expectation exists that, in the first clustering, objects of the common cluster based on the first information source would also be clustered together in the second clustering based on the second information source.

8. The computer program product of claim 7, wherein identifying the at least one horizontal anomaly comprises performing a spectral clustering method to cluster of the objects across the plurality of information sources.

9. The computer program product of claim 8, wherein the spectral clustering method comprises:
determining a graph Laplacian of the similarity matrix, where eigenvectors of the graph Laplacian are partitioned into components corresponding to individual ones of the plurality of information sources;
determining a distance between the components for each of the objects; and
classifying each of the objects into the horizontal anomalies according to the respective distances.

10. The computer program product of claim 9, wherein higher quantitative scores correspond to anomalies.

11. A horizontal anomaly detection method comprising:
determining a plurality of different N×N similarity matrices for N objects, wherein entries of each similarity matrix define similarities between different pairs of the N objects from a plurality of different information sources, and wherein each of the plurality of different similarity matrices represents a unique set of criteria by which the N objects may be grouped as similar;
performing a soft clustering on the similarity matrices together with a constraint that an object should be similarly assigned to a same cluster in each of the similarity matrices; and
quantifying a difference between clustering solutions of each similarity matrices to identify scores that signify a first clustering of at least two objects of the N objects into a common cluster based on a first information source of the plurality of different information sources and simultaneously performing a second clustering of the at least two objects of the N objects into different clusters based on a second information source of the plurality of different information sources, wherein an expectation exists that, in the first clustering, objects of the common cluster based on the first information source would also be clustered together in the second clustering based on the second information source,
wherein each of the plurality of different information sources are combined by:
placing each similarity matrix along a block diagonal of a combined similarity matrix; and filling off-diagonal entries of the combined similarity matrix using weighted identity matrices, wherein a weight of the weighted identity matrices is a constraint on relationships across the plurality of different information sources.

12. The horizontal anomaly detection method of claim 11, wherein the scores indicate similarity between pairs of the objects.

13. The horizontal anomaly detection method of claim 11, wherein quantifying the difference between clustering solutions of each similarity matrices to identify scores that signify the clustering of at least two objects of the N objects into a common cluster based on the first information source of the plurality of different information sources and simultaneously clustering the at least two objects of the N objects into different clusters based on the second information source of the plurality of different information sources constitutes identifying at least one horizontal anomaly.

14. The horizontal anomaly detection method of claim 13, wherein identifying the at least one horizontal anomaly comprises performing a spectral clustering method to cluster of the objects across the plurality of information sources.

15. The horizontal anomaly detection method of claim 11, wherein the similarity matrices comprise a feature vector of the entries for each of the objects and each entry corresponds to a similarity between a different pair of the objects.

* * * * *